(12) United States Patent
Han et al.

(10) Patent No.: US 7,403,800 B2
(45) Date of Patent: Jul. 22, 2008

(54) REVERSE ACTIVITY BIT SETTING SYSTEM AND METHOD

(76) Inventors: Kyoo Jin Han, 506-801, Gong-Jak Apt., 1587, Gwangyang-dong, Dongan-gu, Anyang-si, Gyeonggi-do (KR); Ji Young Hwang, 117-206, Joo-gong Apt., Naeson-dong, Uiwang-si, Gyeonggi-do (KR)

( * ) Notice: Subject to any disclaimer, the term of this patent is extended or adjusted under 35 U.S.C. 154(b) by 98 days.

(21) Appl. No.: 10/733,990

(22) Filed: Dec. 10, 2003

(65) Prior Publication Data
US 2004/0121808 A1 Jun. 24, 2004

(30) Foreign Application Priority Data
Dec. 11, 2002 (KR) ............ 10-2002-0078797
Dec. 12, 2002 (KR) ............ 10-2002-0079101

(51) Int. Cl.
*H04M 1/00* (2006.01)
(52) U.S. Cl. .............. 455/561; 455/424; 455/67.11; 455/69; 370/252; 370/329; 370/278
(58) Field of Classification Search ............ 455/561, 455/69, 522, 452.2, 67.11, 424; 370/328, 370/332, 333, 252, 278, 329
See application file for complete search history.

(56) References Cited

U.S. PATENT DOCUMENTS

| 6,822,969 | B2 * | 11/2004 | Love et al. ............ 370/444 |
| 6,983,153 | B2 * | 1/2006 | Jain et al. ............ 455/453 |
| 7,054,275 | B2 * | 5/2006 | Kim et al. ............ 370/252 |
| 2002/0141349 | A1 * | 10/2002 | Kim et al. ............ 370/252 |
| 2002/0154610 | A1 * | 10/2002 | Tiedemann et al. ...... 370/329 |
| 2002/0186657 | A1 * | 12/2002 | Jain et al. ............ 370/235 |
| 2002/0196755 | A1 * | 12/2002 | Hidaka et al. .......... 370/335 |
| 2003/0002456 | A1 * | 1/2003 | Soomro et al. ......... 370/328 |
| 2003/0093364 | A1 * | 5/2003 | Bae et al. ............. 705/37 |
| 2004/0023661 | A1 * | 2/2004 | Pi et al. ............. 455/450 |
| 2004/0092232 | A1 * | 5/2004 | Zeira et al. .......... 455/67.11 |
| 2004/0095960 | A1 * | 5/2004 | Attar et al. .......... 370/468 |
| 2004/0100921 | A1 * | 5/2004 | Khan ................. 370/321 |
| 2004/0109424 | A1 * | 6/2004 | Chheda .............. 370/331 |
| 2004/0120287 | A1 * | 6/2004 | Lott et al. ........... 370/332 |
| 2004/0166669 | A1 * | 8/2004 | Saito ................ 438/638 |
| 2004/0202136 | A1 * | 10/2004 | Attar et al. .......... 370/333 |
| 2004/0258035 | A1 * | 12/2004 | Fan et al. ............ 370/342 |
| 2005/0169301 | A1 * | 8/2005 | Jain et al. ............ 370/464 |
| 2006/0146876 | A1 * | 7/2006 | Kim et al. ............ 370/468 |

* cited by examiner

*Primary Examiner*—Duc M. Nguyen
*Assistant Examiner*—Khawar Iqbal

(57) ABSTRACT

In a mobile communication system, a method of setting a reverse activity bit (RAB) is provided. The method comprises measuring a rise over thermal noise-measured (ROTm) representing a load degree of a reverse link; comparing the ROTm with a setup reference value (ROTm_th); setting the RAB to lower data rate of a terminal, when the ROTm is greater than the ROTm_th; enabling a base station to receive and monitor a variation state of the ROTm, when the ROTm is less than the ROTm_th; and setting the RAB to control the data rate according to the variation state of the ROTm.

19 Claims, 4 Drawing Sheets

REVERSE ACTIVITY BIT SETTING SYSTEM AND METHOD

CROSS REFERENCE TO RELATED APPLICATIONS

This application claims the benefit of the Korean Application No. 10-2002-0078797 filed on Dec. 11, 2002 and No. 10-2002-79101 filed on Dec. 12, 2002, the content of which is hereby incorporated by reference in its entirety.

BACKGROUND OF THE INVENTION

1. Field of the Invention

The present invention relates to a method of setting a reverse activity bit in a mobile communication environment, and more particularly, to a method of setting a reverse activity bit for enabling subscribers in a cell or sector to receive services and to increase a reverse link capacity.

2. Discussion of the Related Art

Generally, 1xEV-DO is a system for exclusive data communication developed by Qualcomm Inc., U.S.A. in the late 1990's to provide general data communication services in non-realtime wireless mobile environments. The 1xEV-DO system adopts intrinsic resource assignment methods corresponding to the characteristics of forward and reverse links.

In a forward link, a base station continuously transmits pilot signals with a constant power. Each terminal in a cell measures intensity of each of the pilot signals to determine the channel status of the forward link. Once such a status is reported to the base station, a scheduler of the base station determines which terminal will receive an assignment of a forward link resource.

This determination is made in accordance with the forward link channel status reported from each of the terminals in every slot with time division. The scheduler operates so that more resources are assigned to the terminal with a better channel status. This maximizes total data throughput of forward link for each cell.

In a reverse link, a base station receives reverse pilot signals from terminals scattered in a cell. The base station is unable to check reverse link characteristics of the respective terminals from reception signal intensity received from each of the terminals via an antenna of the base station.

Instead, the base station measures intensity of total reception signals received via its antenna, thereby indirectly controlling a load amount in reverse link by directing reverse link resource assignment of the same level to all terminals based on the measurement value.

Each of the terminals in the cell receives reverse activity bit (hereinafter abbreviated 'RAB') by each slot from the base station, and the terminal then determines a data rate of next frame with probability based on a value of the received RAB.

If the RAB received from the base station is to lower the data rate, each of the terminals determines whether to lower or maintain the data rate of the next frame with probability according to the current reverse link data rate. If the base station directs to raise the data rate, each of the terminals determines the data rate of the next frame by the same method.

A reverse traffic channel has six kinds of transmission rates shown in Table 1.

TABLE 1

| Transmission rate (Kbps) | Maximum payload (bits) |
| --- | --- |
| 0 | 0 |
| 9.6 | 234 |
| 19.2 | 490 |
| 38.4 | 1002 |
| 76.8 | 2026 |
| 153.6 | 4076 |

The terminal uses one of the transmission rates in Table 1 for transmission. In this case, the terminal enables to raises or lowers the transmission rate of reverse traffic channel using the information (RAB) received from the base station.

Thus, each of the terminals in the cell adjusts data rate of reverse link according to RAB set by the base station. RAB setup directly becomes a means for adjusting the load amount of reverse link.

Qualcomm Inc. has proposed two methods for setting RAB, and the first method is recommended.

The first method uses thermal noise power vs. reception signal power (hereinafter abbreviated ROTm). The ROTm is a measurement value (dB basis), which is found by subtracting thermal noise power (Rx Power_Thermal) of a base station system from total reception power (Rx Power_Total) received from an antenna of a receiving-end of base station, for judging a load status of reverse link. ROTm is periodically measured by a RF device in the base station.

If ROTm measured in a receiving-end of an access network per each slot (1.67 ms) for each sector and antenna is higher than a reference value (ROTm_th, 5 dB recommended), RAB is set to '1' to direct to lower transmission data rate of the terminal. If ROTm is lower than the reference value, RAB is set to '0' to direct to raise data rate of the terminal. A basic setup value of RAB is basically '0'.

Meanwhile, the second method uses a calculated ROT value (hereinafter abbreviated 'ROTc'). A reverse load can be found by the second method using an equation. Firstly, a ratio of reception pilot power vs. total reception power is found for each reception data rate using variables such as DataOffset-Norm, DataOffset9k6(9,600).

ROTc that means a reverse link load of a corresponding sector can be found by multiplying a total of f(DataRate) values of the entire access terminals in the sector by Ecp/Io [average energy per chip of pilot channel in antenna vs. PSD (power spectral density) of total reception signals]. Yet, such an equation fails to consider power by ACK channel. The related art method of setting RAB (reverse activity bit) in a communication system has the following problems or disadvantages.

In case of a terminal for 1xEV-DO, since data rate of next frame is determined by probability according to RAB received from a base station, the base station is unable to accurately control or determine a reception load amount in the next frame or a reception signal power of an antenna end despite setting and transmitting the RAB to the terminal.

Second, in case two terminals located close to a base station, with a moderate frame offset difference therebetween, detect RAB to increase data rate, and determine to simultaneously increase their data rates and transmission power, total reception signal power is increased. Also signal vs. noise ratio for each call is degraded, and the terminals competitively raise their transmission power by fast closed loop power control. All of the terminals in the cell will then transmit with maximum power as high as they can.

If such a situation takes place under a ROT value lower than a reference value (ROTm_th), the transmission power is unnecessarily increased. This causes extra power consumption and adversely influences the reverse link of a neighboring cell.

In order to overcome the second problem, the reference value (ROTm_th) is compared to the measured ROT value. If the reference value is lower, the number of times of RAB commands directing the terminal to lower the transmission data rate is increased before a reception capacity limit is reached. This results in reducing the reception capacity of reverse link.

Moreover, since the accuracy of ROT measured by a base station of a current mobile communication system such as 1xEV-DO system is not reliable yet, the related art method of setting RAB by simply comparing the measured ROT value to the reference value ROTm_th has various limitations in many aspects. Hence, a new method enabling to overcome such limitations is needed.

SUMMARY OF THE INVENTION

In a mobile communication system, a method of setting a reverse activity bit (RAB) comprises measuring a rise over thermal noise-measured (ROTm) representing a load degree of a reverse link; comparing the ROTm with a setup reference value (ROTm_th); setting the RAB to lower data rate of a terminal, when the ROTm is greater than the ROTm_th; enabling a base station to receive and monitor a variation state of the ROTm, when the ROTm is less than the ROTm_th; and setting the RAB to control the data rate according to the variation state of the ROTm.

In some embodiments, the method further comprises dividing the ROTm into at least two states according to the variation state of the ROTm; setting the RAB to lower the data rate according to one of the at least two states; and setting the RAB according to a transition degree of the state of the ROTm.

The RAB is reset when the state of the ROTm is changed after the RAB is set, based on formula: RAB set time=RABSetTimeBystate+RABSetTimeByStateTrans, wherein RABSetTimeBystate is a RAB set time corresponding to the state of the ROTm, and RABSetTimeByStateTrans is a RAB set time corresponding to the transition degree of the state of the ROTm.

The RAB set time is updated when the ROTm varies. In one embodiment, the RAB is set according to a ROTc value calculated based on the load degree of the reverse link and the RAB set time.

The RAB can be set to lower the data rate regardless of the ROTc value, when the RAB set time is greater than a first threshold. The ROTc is compared to a ROTc_th threshold for the load degree of the reverse link, when the RAB set time is equal to the first threshold; the RAB is to lower the data rate, when the ROTc is greater than the ROTc_th threshold; and the RAB is set to raise the data rate, when the ROTc is smaller than the ROTc_th threshold.

In another embodiment, the RAB is set to lower transmission data rate of the terminal for a predetermined slot length, when an increment rate of the ROTm calculated according to a variation rate depending on time the ROTm exceeds a previously set upward reference value (ROT_Up); and the RAB is maintained to raise the transmission data rate, when the increment ratio of the variation rate of the ROTm fails to exceed the upward reference value (ROT_Up).

The RAB can be maintained to lower the data rate in case of the ROTm exceeding the reference value (ROTm_th) until the ROTm drops below the upward reference value (ROT_Up). The RAB is generated to raise the data rate prior to a currently set reverse activity bit, when the measured ROTm fails to exceed the reference value (ROTm_th) and a decrement rate of the variation rate of the ROTm downwardly exceeds a previously set downward reference value (ROT_Down).

The predetermined slot length is shortened, in one embodiment, as the ROTm gets lower; and the predetermined slot length is increased as the ROTm gets closer to the reference value (ROTm_th). The predetermined slot length is calculated based on following equation: predetermined slot length=a/ROT(ROTm_th[dB]-ROT_Measured[dB]), where the ROT_measured is a measured ROT value (ROTm), and 'a' is a proportional constant related to the predetermined slot length.

In accordance to another embodiment of the invention, a mobile communication system, a base station system having a function of setting reverse activity bit (RAB) to control a load amount in a reverse link comprises a ROTm measurement unit measuring a ROTm indicating a load degree of the reverse link; a RAB set time calculation unit dividing the ROTm into at least two states of the ROTm to set up a RAB set time separately according to the states of the ROTm; a first comparison unit comparing the ROTm to a reference value (ROTm_th); and a RAB generation unit generating a RAB to lower data rate, when the ROTm is greater than the reference value (ROTm_th) according to a comparison result of the first comparison unit, the RAB generation unit generating the RAB to lower the data rate for the RAB set time when the RAB set time calculated in the RAB set time calculation unit is greater than a first threshold, and maintaining the RAB to raise the data rate, when the ROTm is smaller than the reference value (ROTm_th).

The RAB set time calculation unit calculates the RAB set time based on the states of the ROTm and a transition degree of the states of the ROTm. A ROTc calculation unit for calculating a ROTc based on the load degree of the reverse link; and a second comparison unit for comparing the calculated ROTc to a specific threshold (ROTc_th) may be also included, wherein the RAB generation unit sets the RAB based on the ROTm and the ROTc.

After setting up the RAB set time corresponding to the state of the ROTm and the RAB set time corresponding to the transition degree of the state of the ROTm, the RAB set time calculation unit calculates the RAB set time, when the state of the ROTm is changed, based on following equation: RAB set time=RABSetTimeBystate+RABSetTimeByStateTrans, where RABSetTimeBystate is the RAB set time corresponding to the state of the ROTm, and RABSetTimeByStateTrans is the RAB set time corresponding to the transition degree of the state of the ROTm. The RAB set time is updated when a state transition of the ROTm takes place.

The RAB generation unit sets the RAB to lower the data rate regardless of the ROTc, when the RAB set time is greater than the first threshold, wherein the RAB generation unit compares the ROTc to ROTc_th as a threshold of the load degree of the reverse link when the RAB set time is equal to the first threshold and then sets the RAB to lower the data rate when the ROTc is greater than the ROTc_th, and wherein the RAB generation unit sets the RAB to raise the data rate when the ROTc is smaller greater than the ROTc_th.

In one embodiment, the RAB set time is decreased when the RAB is set to lower the data rate when the RAB set time is greater than the first threshold. The mobile communication system can be a 1xEV-DO system.

In a mobile communication system, a base station system having a function of setting reverse activity bit (RAB) to control a load amount in a reverse link, comprises a ROT measurement unit measuring ROTm as a value of indicating a load degree of the reverse link; a ROT variation rate calculation unit calculating a variation rate of the ROTm; a first comparison unit comparing the ROTm measured in the ROT measurement unit to a reference value (ROTm_th) previously set to a level lower than a maximum ROT a base station can receive; a second comparison unit comparing an increment rate of the variation rate of the ROT calculated from the ROT variation rate calculation unit to a previously set upward reference value (ROT_Up); and a third comparison unit comparing a decrement rate of the variation rate of the ROT calculated from the ROT variation rate calculation unit to a previously set downward reference value (ROT_Down).

A RAB generation unit may be also included for generating RAB to lower transmission data rate to terminals in a cell or sector when the ROTm exceeds the reference value (ROTm_th. The RAB generation unit generates the RAB to lower data rate for a predetermined slot length when the ROTm fails to exceed the reference value and the increment rate of the variation rate of the ROT calculated from the ROT variation rate calculation unit exceeds the ROT_Up. The RAB generation unit generates the RAB to raise the data rate when the ROTm fails to exceed the reference value and the increment rate of the variation rate of the ROT calculated from the ROT variation rate calculation unit fails to exceed the ROT_Up.

The RAB lowers the data rate, which is generated when the ROTm exceeds the reference value (ROTm_th), is maintained each slot until the ROTm goes below the reference value (ROTm_th)

In one embodiment, when the measured ROT fails to exceed the reference value (ROTm_th) and the decrement rate of the variation rate of the ROT downwardly exceeds a previously set downward reference value (ROT_Down), the RAB is generated to raise the data rate prior to a currently set RAB. The predetermined slot length is set shorter as the ROTm gets lower. The predetermined slot length is set longer as the ROTm gets closer to the reference value (ROTm_th).

In another embodiment, the predetermined slot length is calculated based on following equation: slot length=a/ROT (ROTm_th[dB]-ROT_Measured[dB]), where Slot_Length is the predetermined slot length, the ROT_measured is a measured ROT value (ROTm), and 'a' is a proportional constant related to slot length.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE INVENTION

Figure 1:
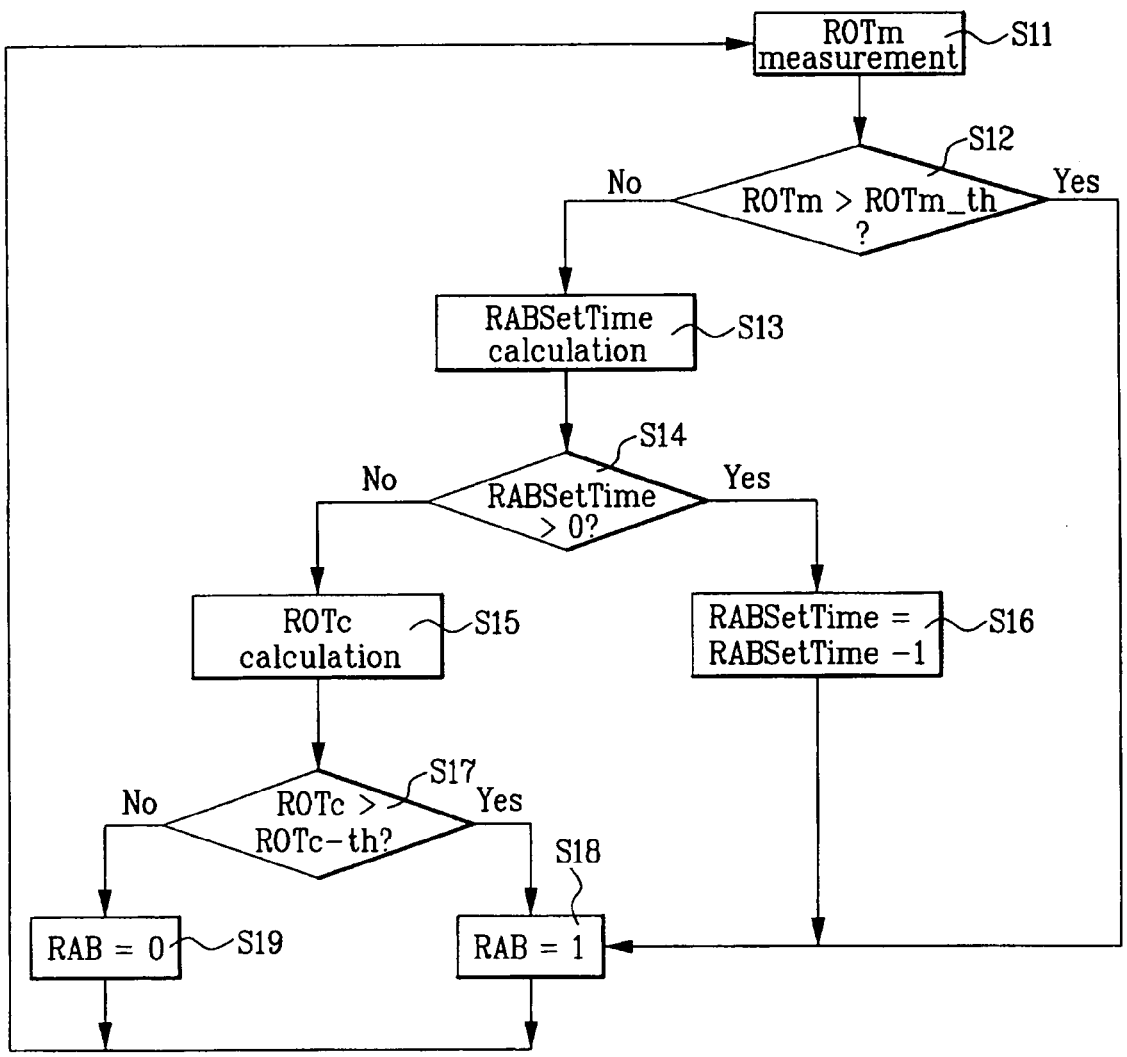
FIG. 1 illustrates a flowchart of a method of setting reverse activity bit according to a first embodiment of the present invention.

Referring to FIG. 1, a base station measures a ROTm value at predetermined time intervals, e.g., slot unit (S11). ROTm is a measured value for judging a load state of reverse link, and is found by subtracting (dB basis) thermal noise power (Rx Power_Thermal) of a base station system from total reception power Rx Power_Total received from an antenna of a reception end of a base station. ROTm is measured by a RF device in the base station.

ROTm is compared to a reference value ROTm_th (S12) If ROTm is greater than ROTm_th, reverse activity bit (RAB) is set based on the raising transmission data rate of a terminal (i.e., RAB=1) (S18). If ROTm is smaller than ROTm_th, a RAB set time (RABSetTime) is calculated (S13), for example.

After RAB set time corresponding to a ROTm state and RAB set time corresponding to a transition degree of the ROTm state are previously set, the RAB set time is calculated whenever the ROTm state is changed. For example, RAB set time can be calculated by Equation 1.

[Equation 1]

RAB_SetTime=RABSetTimeBystate+RABSetTime-ByStateTrans, where RAB_SetTime is RAB set time, RABSetTimeBystate is RAB set time corresponding to a state of ROTm, and RABSetTimeByStateTrans is RAB set time corresponding to a transition degree of the state of ROTm.

In this case, RABSetTime is a value updated again by being calculated whenever a state transition of ROTm takes place. For example, the RABSetTime value is updated when the state transition of ROTm takes place. Even though RAB set time (RABSetTime) is found as a great value depending on a previous increment of high width, the state of ROTm is shifted to a low state, if RABSetTime is updated to a small value. Hence, it is possible to prevent the RAB from being unnecessarily set to decrease the data rate (i.e., RAB=1).

Table 2 is an example of setting the state of ROTm according to its size and managing the state according to received ROTm.

TABLE 2

| ROTmState | ROTm(dB) |
| --- | --- |
| STATE_0 | A1~A2 |
| STATE_1 | A2~A3 |
| STATE_2 | A3~A4 |
| STATE_3 | A4 |

For example, A1~A2 is 0~3 dB, A2~A3 is 3~6 dB, A3~A4 is 6~8 dB, and A4 is over 8 dB.

Table 3 is an example of managing RAB set time which is previously set for each state according to the states of ROTm set in Table 2. RABSetTimeByState is RAB set time defined by slot unit according to a state of ROTm. In a preferred embodiment, RAB set time is prolonged as ROTm gets closer to ROTm_th.

TABLE 3

| ROTmState | RABSetTimeByState [RABLength (slot) unit] |
|---|---|
| STATE_0 | B1 |
| STATE_1 | B2 |
| STATE_2 | B3 |
| STATE_3 | B4 |

An example of managing RAB set time set previously, according to a transition degree of a state of ROT, is shown in Table 4. RABSetTimeByStateTrans means RAB set time set by slot unit to correspond to a transition degree of a state of ROTm. RAB set time is preferably prolonged as the state transition of ROTm increases. If the variation degree of the previous state is big, RAB is set to '1' for a longer time to lower a reverse load amount which is abruptly increased.

TABLE 4

| ROTmTrans | RABSetTimeByStateTrans [RABLength (slot) unit] |
|---|---|
| TransDown_1Step | C1 |
| TransDown_2Step | C2 |
| TransDown_3Step | C3 |
| TransDown_1Step | C4 |
| TransDown_2Step | C5 |
| TransDown_3Step | C6 |

B1~B4 in Table 3 and C1~C3 in Table 4 are sections where slot length increases. C4~C6 are sections where slot length decreases. In some embodiments, C4 to C6 are set to values smaller than those of C1 to C3. For instance, in slot length, B1 to B4 can be applied to 10 to 100 slots and C1 to C3 can be applied to 10 to 1,000 slots.

Equation 1 for finding RAB set time is provided as an example. Thus, RAB set time can be calculated in various ways by considering state of ROTm and/or transition degree of the state according to designer's intention.

In one embodiment, it is determined whether the calculated RAB set time is greater than 0. If the calculated RAB set time is greater than 0, '1' is subtracted from RAB set time and RAB lowers data rate. If the calculated RAB set time is not greater than 0, ROTc as a calculated value for a load degree of reverse link is calculated (S15).

ROTc is calculated by finding a ratio of reception pilot power vs. total reception power for each reception data rate and by multiplying a total of f(DataRate) value of all access terminals in a sector by Ecp/Io, [i.e., average energy per chip of pilot channel in antenna vs. PSD (power spectral density) of total reception signals].

The calculated ROTc is compared to a specific threshold (ROTc_th) (S17). If ROTc is greater than ROTc_th, RAB is set to decrease reverse data rate (S18). If ROTc is smaller than ROTc_th, RAB is unset to increase reverse data rate (S19).

In one embodiment of the present invention, for example, after RAB has been set using ROTm, ROTc is complementarily considered to set RAB. ROTc is used as a method of correcting unstable measurement accuracy. In this case, ROTm_th and ROTc_th may differ and may not be equal to each other, in certain embodiments.

Figure 2:
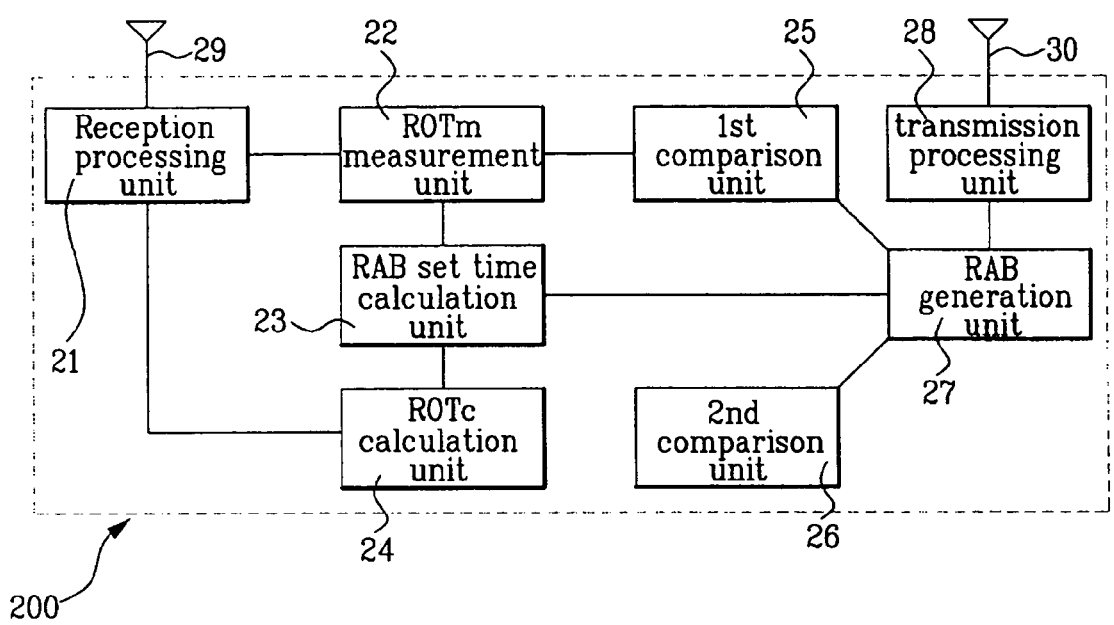
FIG. 2 illustrates a block diagram of a base station system for implementing a first embodiment.

Referring to FIG. 2, a base station system 200 includes a reception processing unit 21, a ROT measurement unit 22, a ROT set time calculation unit 23, a ROTc calculation unit 24, a first comparison unit 25, a second comparison unit 26, a RAB generation unit 27, and a transmission processing unit 28. Numeral '29' in the drawing indicates a reception antenna and numeral '30' indicates a transmission antenna.

The reception processing unit 21 demodulates signals received via the reception antenna 29 from terminals. The ROTm measurement unit 22 measures ROTm representing a load degree of reverse link. The RAB set time calculation unit 23 divides at least two ROTm state to define set time of RAB based on a state of ROTm and/or a degree of state transition of RAB. The ROTc calculation unit 24 calculates ROTc as a calculated value of the load degree of the reverse link.

The first comparison unit 25 compares ROTm to a previously set reference value ROTm_th. The second comparison unit 26 compares ROTc to a previously set specific threshold (ROTc_th).

The RAB generation unit 27 generates RAB based on comparison results of the first and second comparison units 25 and 26 and the RAB set time calculated by the RAB set time calculation unit 23. An exemplary process for generating the RAB from the RAB generation unit 27 is illustrated in FIG. 1. The transmission processing unit 28 modulates a transmission signal carrying the RAB generated from the RAB generation unit 27 to transmit to the respective terminals via the transmission antenna 30.

Figure 3:
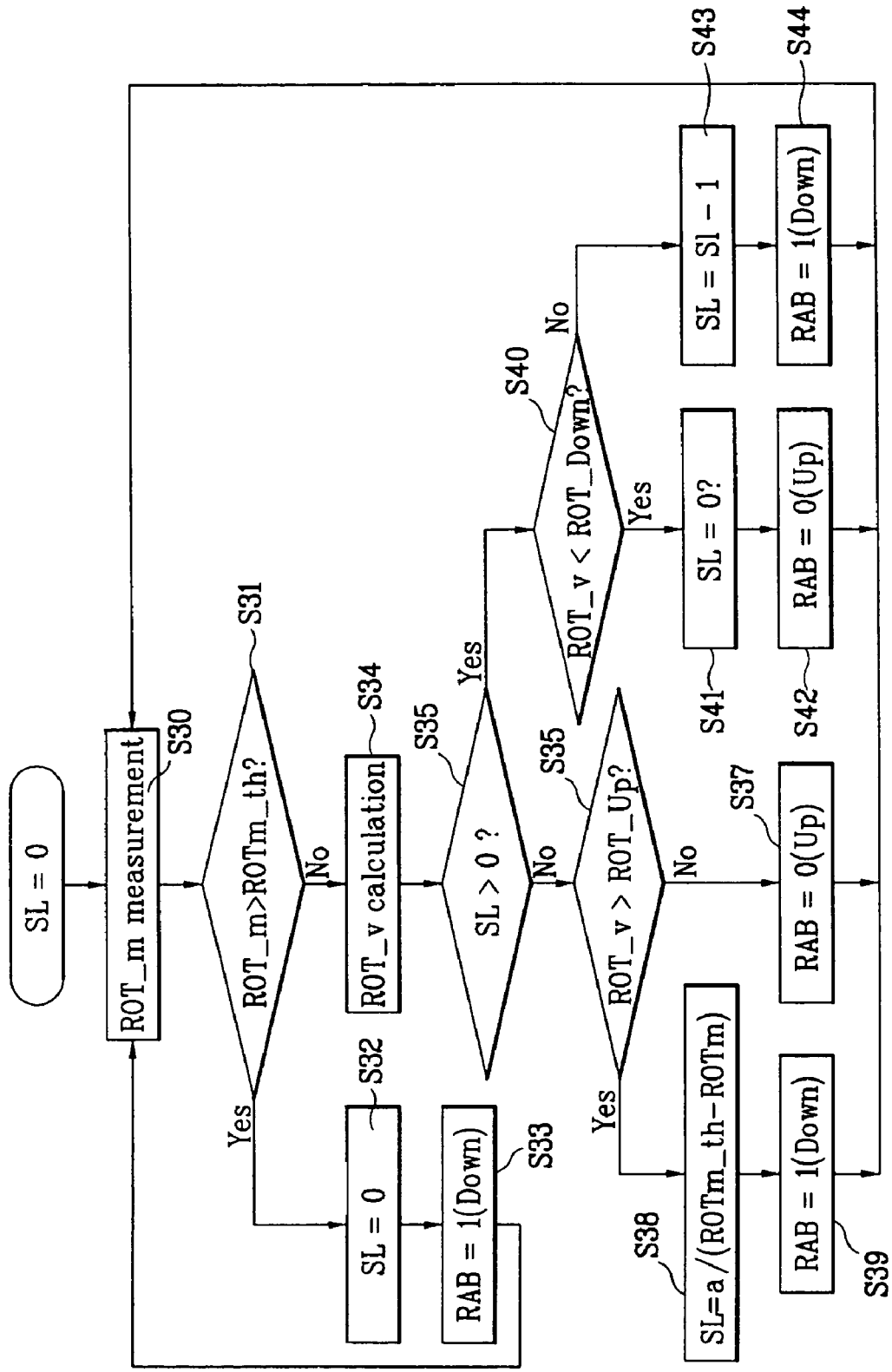
FIG. 3 illustrates a flowchart of a method of setting reverse activity bit according to a second embodiment of the present invention.

Referring to FIG. 3, another embodiment of the invention is provided. ROTm corresponds to a difference (dB unit) between total reception power (Rx Power_Total) received from antenna in a base station reception end and thermal noise power (Rx power_Thermal) of a base station system itself, is measured (S30).

It is then determined whether ROTm exceeds a previously set reference value (ROTm_th) (S31). The reference value (ROTm_th) is set to be a level lower than maximum ROT enabling a base station to receive.

If ROTm exceeds the reference value (ROTm_th) (S31), reverse activity bit (RAB) directing terminals in a cell to lower their transmission data rates is generated. The RAB is maintained in each slot until ROTm falls below the reference value (ROTm_th) (S32, S33).

For reference, basic setting of RAB is a command of raising a transmission data rate of terminal. The terminal once raises its transmission data rate unless there is a separate command of lowering the transmission data rate from the base station.

If ROTm fails to exceed the reference value (ROTm_th) (S31), a variation rate (ROT_v) of ROT is calculated (S34). Based on the calculated result, it is determined whether to maintain the RAB directing to raise the transmission data rate of the terminal or to generate the RAB directing to lower the transmission data rate of the terminal.

It is determined whether an increment rate of ROTm (ROT_v>0) exceeds a setup upward reference value (ROT_Up) (S36) If the increment rate of ROTm (ROT_v>0) fails to exceed the setup upward reference value (ROT_Up) (S36), the RAB command of raising the transmission data rate is maintained (S37), for example.

If the increment rate of ROTm (ROT_v>0) exceeds the setup upward reference value (ROT_Up) (S36) (i.e., if the increment rate is increased faster than the setup value), RAB directing to lower the transmission data rate of the terminal for a predetermined slot length is generated (S38, S39). Hence, it is possible to overcome the related art problem associated with the increase of the transmission power that is unnecessarily transmitted under optimal situation and the reverse link problem of neighboring cells.

In FIG. 3, 'SL' indicates a prescribed slot length in which RAB is set to lower data rate. The prescribed slot length (SL) is determined according to current ROTm. As ROTm gets lower, the slot length maintaining the command of lowering transmission data rate of terminal is set shorter. As ROTm gets closer to threshold (ROTm_th), the slot length is set longer. The prescribed slot length can be found by Equation 2.

[Equation 2]

SL=a/ROT(ROTm_th[dB]−ROT_Measured[dB]), where SL is a prescribed slot length, ROT_measured means ROTm, and 'a' is a proportional constant related to slot length.

In some embodiments, if ROTm is below ROTm_th (S31), it is then determined whether a decrement rate (ROT_v<0) exceeds a downward reference value (ROT_Down) downward (S40). If the decrement rate (ROT_v<0) exceeds the downward reference value (ROT_Down) downward (S40), RAB directing to raise transmission data rate of terminal is generated regardless of the current set RAB (S42).

The RAB generated in this step has a priority to the RAB directing to lower transmission data rate in the step S39. Hence, even if the step S39 is in progress, RAB setting is changed to a command of lowering transmission data rate of terminal, if a condition of the step S42 is satisfied.

If the rate (ROT_V<0) fails to exceed the downward reference value (ROT_Down) downward (S40), SL is reduced by '1' (S43), for example, and RAB is set to keep lowering the data rate of the terminal (S44).

Figure 4:
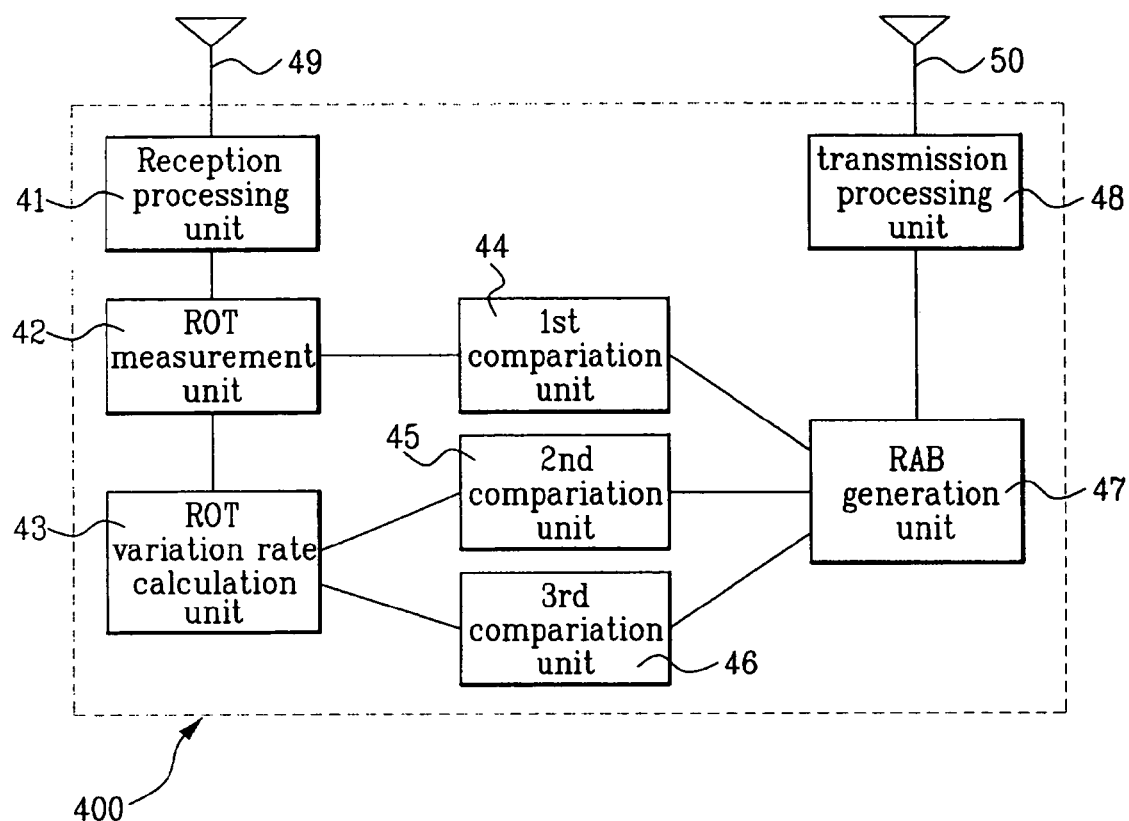
FIG. 4 illustrates a block diagram of a base station system for implementing a second embodiment.

FIG. 4 illustrates a block diagram of a base station system for implementing the second embodiment. A base station system according to the embodiment of the present invention comprises a reception processing unit 41, a ROT measurement unit 42, a ROT variation rate measurement unit 43, a first comparison unit 44, a second comparison unit 45, a third comparison unit 46, a RAB generation unit 47, and a transmission processing unit 48. Numeral '49' in the drawing indicates a reception antenna and numeral '50' indicates a transmission antenna.

The reception processing unit 41 demodulates signals received via the reception antenna 49 from terminals. The ROT measurement unit 42 periodically measures total reception power (Rx Power_Total) received from the reception antenna 49 in a reception end of the base station 400 and thermal noise power (Rx Power_Thermal) of the base station system 400 and measures thermal noise power vs. reception signal power ROT corresponding to a difference (dB unit) of the former two measured values. The ROT variation rate measurement unit 43 calculates a variation rate of ROTm measured by the ROT measurement unit 42.

The first comparison unit 44 compares ROTm measured in the ROT measurement unit 42 to a previously set reference value (ROTm_th). The second comparison unit 45 compares whether an increment rate of the variation rate of ROTm exceeds a previously set reference value (ROT_Up) upward, and the third comparison unit compares whether a decrement rate of the variation rate of ROTm exceeds a preciously set reference value (ROT_Down) downward.

The RAB generation unit 47 generates RAB of directing data transmission amount of reverse link according to the comparison results of the first to third comparison units 44 to 46. Process of generating the RAB from the RAB generation unit 47 is the same as the algorithm in FIG. 1 or 3. The transmission processing unit 48 modulates a transmission signal carrying the RAB generated from the RAB generation unit 47 to transmit to the respective terminals via the transmission antenna 30.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. In a mobile communication system, a method of setting a reverse activity bit (RAB), the method comprising:
   measuring a rise over thermal noise-measured (ROTm) representing a load degree of a reverse link;
   comparing the ROTm with a setup reference value (ROTm_th);
   setting the RAB to lower data rate of a terminal, when the ROTm is greater than the ROTm_th;
   enabling a base station to receive and monitor a variation rate of the ROTm (ROT-v), when the ROTm is less than the ROTm_th;
   dividing the ROTm into at least two states according to the ROT-v;
   setting the RAB to lower the data rate according to one of the at least two states; and
   resetting the RAB, when the state of the ROTm is changed after the RAB is set;
   calculating a RAB set time, when the state of the ROTm is changed, by using the formula:
   RAB set time=RABSetTimeBystate+RABSetTimeByStateTrans,
   wherein RABSetTimeBystate is a RAB set time corresponding to the state of the ROTm, and RABSetTimeByStateTrans is a RAB set time corresponding to the transition degree of the state of the ROTm.

2. The method of claim 1, further comprising:
   updating the RAB set time when the ROTm varies.

3. The method of claim 2, further comprising:
   setting the RAB according to a calculated value of the rise over thermal noise (ROTc) value calculated based on the load degree of the reverse link and the RAB set time.

4. The method of claim 3, further comprising:
   setting the RAB to lower the data rate regardless of the ROTc value, when the RAB set time is greater than a first threshold.

5. The method of claim 4, further comprising:
   comparing the ROTc to a threshold ROTc_th for the load degree of the reverse link, when the RAB set time is equal to the first threshold;
   setting the RAB to lower the data rate, when the ROTc is greater than the threshold ROTc_th; and
   setting the RAB to raise the data rate, when the ROTc is smaller than the threshold ROTc_th.

6. The method of claim 1, wherein the step of setting the RAB comprises:
   setting the RAB to lower transmission data rate of the terminal for a predetermined slot length, when an increment rate of the ROTm calculated according to a variation rate depending on time the ROTm exceeds a previously set upward reference value (ROT_Up); and
   maintaining the RAB to raise the transmission data rate, when the increment ratio of ROT-v fails to exceed the upward reference value (ROT_Up).

7. The method of claim 6, further comprising:
   maintaining the RAB to lower the data rate in case of the ROTm exceeding the reference value (ROTm_th) until the ROTm drops below the upward reference value (ROT_Up).

8. The method of claim 6, further comprising:
   generating the RAB to raise the data rate prior to a currently set reverse activity bit, when the measured ROTm fails to exceed the reference value (ROTm_th) and a decrement rate of the variation rate of the ROTm downwardly exceeds a previously set downward reference value (ROT_Down).

9. The method of claim 6, further comprising:
shortening the predetermined slot length as the ROTm gets lower; and
increasing the predetermined slot length as the ROTm gets closer to the reference value (ROTm_th).

10. The method of claim 9, further comprising:
calculating the predetermined slot length based on following equation:

slot length=$a$/(ROTm-th−ROTm), where the ROT_measured is a measured ROT value (ROTm), and
'a' is a proportional constant related to the predetermined slot length.

11. The method of claim 1, wherein the mobile communication system is a 1xEV-DO system.

12. In a mobile communication system, a base station system having a function of setting reverse activity bit (RAB) to control a load amount in a reverse link, comprising:
a ROTm measurement unit measuring a ROTm indicating a load degree of the reverse link;
a RAB set time calculation unit dividing the ROTm into at least two states of the ROTm to set up a RAB set time separately according to the states of the variation of the ROTm;
a first comparison unit comparing the ROTm to a reference value (ROTm_th); and
a RAB generation unit generating a RAB to lower data rate, when the ROTm is greater than the reference value (ROTm_th) according to a comparison result of the first comparison unit, the RAB generation unit generating the RAB to lower the data rate for the RAB set time when the RAB set time calculated in the RAB set time calculation unit is greater than a first threshold, and maintaining the RAB to raise the data rate, when the ROTm is smaller than the reference value (ROTm_th).

13. The base station system of claim 12, wherein the RAB set time calculation unit calculates the RAB set time based on the states of the ROTm and a transition degree of the states of the ROTm.

14. The base station system of claim 13, wherein after setting up the RAB set time corresponding to the state of the ROTm and the RAB set time corresponding to the transition degree of the state of the ROTm, the RAB set time calculation unit calculates the RAB set time, when the state of the ROTm is changed, based on following equation:

RAB set time=RABSetTimeBystate+RABSetTimeByStateTrans,

Wherein the RABSetTimeBystate is a set time corresponding to the state of the ROTm, and the RABSetTimeByStateTrans is a set time corresponding to the transition degree of the state of the ROTm.

15. The base station system of claim 12, further comprising:
a ROTc calculation unit calculating a calculated value of the rise over thermal noise (ROTc) based on the load degree of the reverse link; and
a second comparison unit comparing the ROTc to a specific threshold (ROTc_th),
wherein the RAB generation unit sets the RAB based on the ROTm and the ROTc.

16. The base station system of claim 15, wherein the RAB generation unit sets the RAB to lower the data rate regardless of the ROTc, when the RAB set time is greater than the first threshold, wherein the RAB generation unit compares the ROTc to ROTc_th as a threshold of the load degree of the reverse link when the RAB set time is equal to the first threshold and then sets the RAB to lower the data rate when the ROTc is greater than the ROTc_th, and wherein the RAB generation unit sets the RAB to raise the data rate when the ROTc is smaller greater than the ROTc_th.

17. The base station system of claim 16, wherein the RAB set time is decreased when the RAB is set to lower the data rate when the RAB set time is greater than the first threshold.

18. The base station system of claim 12, wherein the RAB set time is updated when a state transition of the ROTm takes place.

19. The base station system of claim 12, wherein the mobile communication system is a 1xEV-DO system.

* * * * *